United States Patent
Cho (10) Patent No.: US 12,549,024 B2
(45) Date of Patent: Feb. 10, 2026

(54) SYSTEM AND METHOD FOR MANAGING BATTERY

(71) Applicant: LG INNOTEK CO., LTD., Seoul (KR)

(72) Inventor: Ig Hyun Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/668,565

(22) Filed: May 20, 2024

(65) Prior Publication Data

US 2024/0313561 A1 Sep. 19, 2024

Related U.S. Application Data (63) Continuation of application No. 17/281,461, filed as application No. PCT/KR2019/008714 on Jul. 15, 2019, now Pat. No. 12,021,403.

(30) Foreign Application Priority Data

Oct. 18, 2018 (KR) ........................ 10-2018-0124366

(51) Int. Cl.
 *H02J 7/00* (2006.01)
(52) U.S. Cl.
 CPC ...... *H02J 7/0047* (2013.01); *H02J 7/007182* (2020.01)
(58) Field of Classification Search
 CPC .......................... H02J 7/0047; H02J 7/007182
 USPC ......................................................... 320/134
 See application file for complete search history.

(56) References Cited

U.S. PATENT DOCUMENTS

| 6,501,249 B1* | 12/2002 | Drori ................. H02J 7/00716 320/149 |
| 7,053,632 B1* | 5/2006 | Liang ................. H02M 3/33561 320/149 |
| 11,018,599 B1* | 5/2021 | Vinciarelli ............ H02M 7/003 |
| 2010/0301868 A1* | 12/2010 | Ishikawa .............. G01R 31/396 324/434 |

(Continued)

FOREIGN PATENT DOCUMENTS

| CN | 104348221 A | 2/2015 | |
| EP | 3018687 A2 * | 5/2016 | ............. H01H 47/22 |

(Continued)

OTHER PUBLICATIONS

International Search Report dated Oct. 18, 2019 in International Application No. PCT/KR2019/008714.

(Continued)

*Primary Examiner* — Suresh Memula
(74) *Attorney, Agent, or Firm* — Saliwanchik, Lloyd & Eisenschenk (57) ABSTRACT

Disclosed is a system for managing a battery, the system comprising a first processor, a second processor, an isolator, a sensor unit, a switch unit, etc. The isolator can be disposed between the first processor and the second processor, and the first processor and the second processor can transmit and receive information through the isolator. The first processor can transmit monitoring request signals for a plurality of nodes to the second processor through the isolator, and the second processor can transmit voltage values for the plurality of nodes to the first processor.

14 Claims, 7 Drawing Sheets

(56) References Cited

U.S. PATENT DOCUMENTS

| | | | | |
|---|---|---|---|---|
| 2011/0234176 A1* | 9/2011 | Nakamura | ........ | H02M 7/53871 |
| | | | | 320/166 |
| 2013/0076129 A1* | 3/2013 | Kunimitsu | .............. | B60L 58/15 |
| | | | | 307/10.7 |
| 2014/0015488 A1* | 1/2014 | Despesse | ............ | H01M 10/441 |
| | | | | 429/7 |
| 2014/0285936 A1* | 9/2014 | Garbacik | ................ | B60L 58/15 |
| | | | | 361/88 |
| 2015/0280487 A1* | 10/2015 | Nakazawa | .............. | B60L 58/20 |
| | | | | 320/101 |
| 2015/0291052 A1* | 10/2015 | Nakazawa | .............. | B60R 16/03 |
| | | | | 320/101 |
| 2016/0356857 A1 | 12/2016 | Kaupp et al. | | |
| 2017/0214252 A1* | 7/2017 | Preindl | ................... | H02J 7/345 |
| 2018/0297474 A1* | 10/2018 | Lee | ....................... | H02J 7/0047 |
| 2022/0115879 A1* | 4/2022 | Kahn | ................ | H01M 10/4257 |

FOREIGN PATENT DOCUMENTS

| | | | | | |
|---|---|---|---|---|---|
| EP | 3703092 A1 | * | 9/2020 | ............ | H01H 47/32 |
| EP | 3975402 A1 | * | 3/2022 | ............ | H02J 7/345 |
| JP | 11-299122 A | | 10/1999 | | |
| JP | 2010-279146 A | | 12/2010 | | |
| JP | 2018-26975 A | | 2/2018 | | |
| KR | 10-2013-0034618 A | | 4/2013 | | |
| KR | 10-2013-0112739 A | | 10/2013 | | |
| KR | 10-2018-0113311 A | | 10/2018 | | |
| KR | 10-2021-0111478 A | | 9/2021 | | |
| KR | 20210111478 A | * | 9/2021 | ............ | G01R 31/396 |
| WO | WO-0032443 A2 | * | 6/2000 | ............. | B60K 28/14 |
| WO | WO-2016165017 A1 | * | 10/2016 | ............ | H02M 7/219 |
| WO | WO-2020080648 A1 | * | 4/2020 | ............ | G01R 31/396 |

OTHER PUBLICATIONS

Supplementary European Search Report dated Apr. 29, 2022 in European Application No. 19872542.6.
Office Action dated Jun. 20, 2023 in Japanese Application No. 2021-520555.
Office Action dated Aug. 31, 2023 in U.S. Appl. No. 17/281,461.
Notice of Allowance dated Feb. 20, 2024 in U.S. Appl. No. 17/281,461.
Office Action dated Sep. 7, 2024 in Chinese Application No. 201980068209.2.
Office Action dated Dec. 6, 2024 in Korean Application No. 10-2024-0148679.

* cited by examiner

SYSTEM AND METHOD FOR MANAGING BATTERY

CROSS-REFERENCE TO RELATED APPLICATIONS

This application is a continuation of U.S. application Ser. No. 17/281,461, filed Mar. 30, 2021; which is the U.S. national stage application of International Patent Application No. PCT/KR2019/008714, filed Jul. 15, 2019, which claims the benefit under 35 U.S.C. § 119 of Korean Patent Application No. 10-2018-0124366, filed Oct. 18, 2018, the disclosures of each of which are incorporated herein by reference in their entirety.

TECHNICAL FIELD

In the present disclosure, a system and method for managing a battery using one or more processors are provided.

BACKGROUND ART

Isolators are used when modules operating in different voltage regions are connected to each other. In particular, when modules operating in a high voltage region and modules operating in a low voltage region operate in conjunction with each other, an isolator must be disposed in an appropriate position to block leakage current and perform the operation as intended.

However, in the case of isolators, since the cost is high, it is desirable to reduce the number of isolators when configuring a product. Accordingly, efforts have been made to reduce the number of isolators to be used when modules operating in different voltage regions are interconnected. In particular, when a high voltage battery is used, a method of reducing the number of isolators is required when a circuit is configured to use modules operating at a low voltage together.

DETAILED DESCRIPTION OF THE INVENTION

Technical Subject

The present disclosure can provide a system and apparatus for managing a battery. Specifically, a battery management system and apparatus for performing battery management using a small number of isolators are provided. The battery management system may include a first processor, a second processor, an isolator, a sensor unit, a switch unit, and the like, and the isolator may be disposed between the first processor and the second processor.

The technical subject to be solved is not limited to the technical subjects as described above, and various technical subjects may be further included within a scope that is obvious to a person skilled in the art.

Technical Solution

A battery management system according to the first aspect comprises: a first processor operating in a low voltage region; a second processor operating in a high voltage region; an isolator disposed between the first processor and the second processor; a sensor unit sensing voltages for a plurality of nodes; and a switch unit disposed between the sensor unit and the second processor, wherein the first processor transmits a monitoring request signal for the plurality of nodes to the second processor through the isolator, wherein the second processor controls the switch unit according to the monitoring request signal to obtain voltage values for the plurality of nodes, and wherein the second processor may transmit the voltage value to the first processor through the isolator.

In addition, the switch unit may include a plurality of switches, and the sensor unit may include a plurality of sensors corresponding to the plurality of switches.

In addition, the switch unit is controlled by the second processor, and a current is connected to the sensor unit when the switch unit is turned on, and the current connected to the sensor unit may be cutoff when the switch unit is turned off.

In addition, the plurality of nodes may include at least one among nodes at both ends of the relay and both ends of the fuse.

In addition, the relay may transmit a high voltage power applied from a battery to at least one among a motor, an output terminal, and a display.

In addition, a ground level of the low voltage region and a ground level of the high voltage region may be different from each other, a voltage used in the low voltage region may be 12V or less, and a voltage used in the high voltage region may be 500V or less.

In addition, the first processor may be disposed on a first substrate, and the second processor may be disposed on a second substrate.

In addition, the first processor may provide information on charging and discharging states of the battery.

A method for managing a battery according to the second aspect may comprise the steps of: transmitting a monitoring request signal for a plurality of nodes to a second processor operating in a high voltage region through an isolator, by a first processor operating in a low voltage region; obtaining voltage values for the plurality of nodes according to the monitoring request signal by the second processor; and transmitting the voltage values to the first processor through the isolator by the second processor.

The third aspect may provide a computer-readable non-transitory recording medium in which a program for implementing the method of the second aspect is recorded.

Advantageous Effects

The present disclosure can provide a system and method for managing a battery. Specifically, a system for performing battery management is disclosed by transmitting information using an isolator disposed between a first processor operating in a low voltage region and a second processor operating in a high voltage region. The number of isolators required may be reduced by being disposed in the first processor and the second processor.

BRIEF DESCRIPTION OF DRAWINGS

FIG. 5 is a diagram illustrating an example in which a battery management system according to an embodiment operates with a battery, a BEM, an ECU, and the like.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being "connected", "coupled", or "jointed" to another component, the component may be directly connected, coupled, or interconnected to the other component, however, it should be understood that another element may be "connected", "coupled" or "interconnected" between components.

In addition, when described as being formed or disposed in "on (above)" or "below (under)" of each component, "on (above)" or "below (under)" means that it includes not only the case where the two components are directly in contact with, but also the case where one or more other components are formed or disposed between the two components. In addition, when expressed as "on (above)" or "below (under) ", the meaning of not only an upward direction but also a downward direction based on one component may be included.

Hereinafter, embodiments of the present invention will be described in detail with reference to the drawings.

Figure 1:
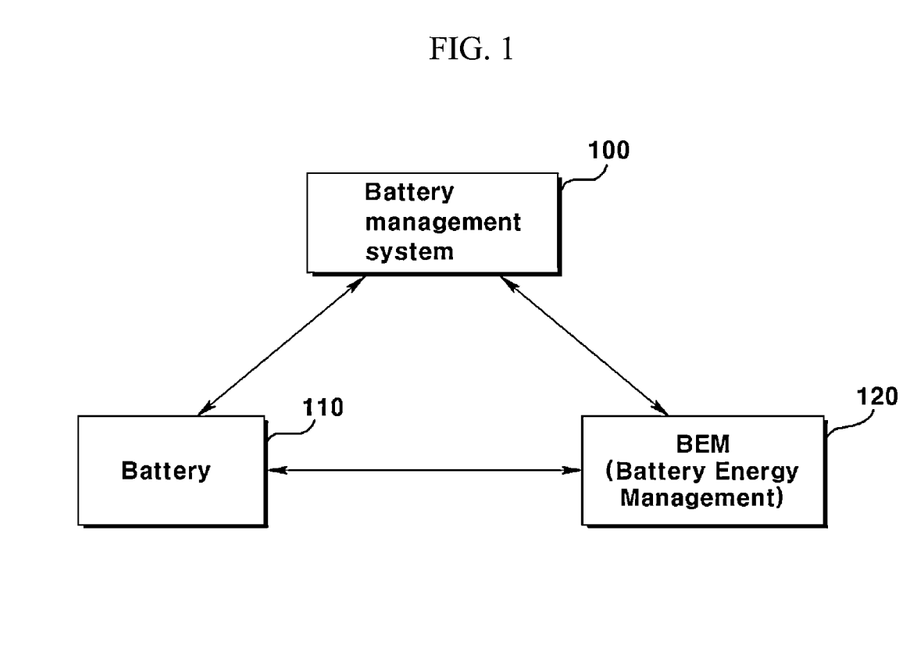
FIG. 1 is a diagram illustrating an example in which a battery management system according to an embodiment operates with a battery and a BEM.

FIG. 1 is a diagram illustrating an example in which a battery management system 100 according to an embodiment operates with a battery 110 and a BEM 120.

A battery management system 100 according to an embodiment may operate in conjunction with a battery 110 and a BEM 120. The battery management system 100 may monitor the state of the battery 110 and the BEM 120. Specifically, the battery management system 100 may sense voltages for a plurality of nodes connected to the battery 110 to monitor various states, and may output the monitored result. For example, the battery management system 100 may output an alarm when a relay or fuse does not perform a normal operation.

Figure 2:
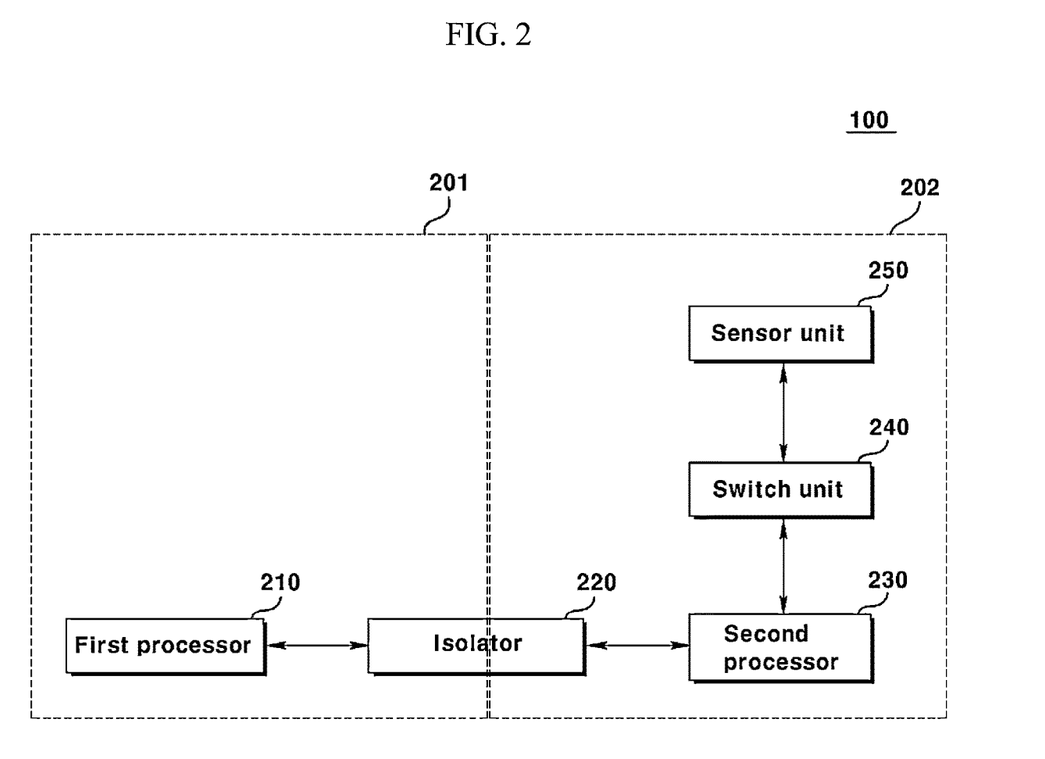
FIG. 2 is a block diagram illustrating an example in which a battery management system according to an embodiment operates using a first processor and a second processor.

FIG. 2 is a block diagram illustrating an example in which a battery management system 100 according to an embodiment operates using a first processor 210 and a second processor 230.

As illustrated in FIG. 2, the battery management system 100 may include a first processor 210, an isolator 220, a second processor 230, a switch unit 240, and a sensor unit 250. The battery management system 100 according to an embodiment may include a low voltage region 201 and a high voltage region 202. The isolator 220 may connect the low voltage region 201 and the high voltage region 202.

However, it can be understood by a person skilled in the art that general-purpose components other than the components illustrated in FIG. 2 may be further included in the battery management system 100. For example, the battery management system 100 may further include a memory (not shown) connected to the first processor 210 or the second processor 230. The term "memory" can be broadly interpreted to include any electronic component capable of storing electronic information. The term memory may refer to various types of processor-readable media such as is random access memory (RAM), read-only memory (ROM), non-volatile random access memory (NVRAM), programmable read-only memory (PROM), erase-programmable read-only memory (EPROM), electrical erasable PROM (EEPROM), flash memory, magnetic or optical data storage, registers, and the like. If the first processor 210 and/or the second processor 230 is capable of reading information from and/or writing information to the memory, the memory is said to be in electronic communication with the first processor 210 and/or the second processor 230. The memory integrated in the first processor 210 and/or the second processor 230 is in electronic communication with the processor.

Also, the memory may include at least one type of storage medium among flash memory type, hard disk type, multimedia card micro type, card type memory (for example, SD or XD memory, and the like), random access memory (RAM), static random access memory (SRAM), read-only memory (ROM), electrically erasable programmable read only memory (EEPROM), programmable read-only memory (PROM), magnetic memory, magnetic disk, optical disk, and the like.

The first processor 210 and/or the second processor 230 according to an embodiment may perform a communication function. For example, the first processor 210 and/or the second processor 230 may communicate with an external device using a Wi-Fi chip, a Bluetooth chip, or the like, and may communicate with an internal module according to a predetermined protocol. The Wi-Fi chip and the Bluetooth chip can perform communication using a Wi-Fi method and a Bluetooth method, respectively. When using a Wi-Fi chip or a Bluetooth chip, various types of connection information such as an SSID and a session key may be transmitted and received first, and then various types of information may be transmitted and received after a communication connection using the same. The wireless communication chip may perform communication according to various communication standards such as IEEE, ZigBee, 3rd Generation (3G), 3rd Generation Partnership Project (3GPP), and Long Term Evolution (LTE). The NFC chip can operate in a near field communication (NFC) method using a 13.56 MHz band among various RF-ID frequency bands such as 135 kHz, 13.56 MHZ, 433 MHZ, 860 to 960 MHz, and 2.45 GHz. In addition, the first processor 210 and/or the second processor 230 may perform communication through a local interconnect network (LIN) bus or a LIN interface.

The first processor 210 according to an embodiment may operate in the low voltage region 201, and the second processor 230 may operate in the high voltage region 202. In addition, an isolator 220 may be disposed between the first processor 210 and the second processor 230. The isolator 220 may mutually transmit information between the first processor 210 and the second processor 230.

The low voltage region 201 and the high voltage region 202 may operate in different voltage ranges. For example, the voltage used in the low voltage region 201 may be 0V to 12V, and the voltage used in the high voltage region 202 may be 0V to 500V. Specifically, the voltage range in which the module included in the high voltage region 202 operates may be 300V to 500V.

Further, the ground level of the low voltage region 201 and the ground level of the high voltage region 202 may be different from each other. The ground of the low voltage region 201 and the ground of the high voltage region 202 may not be electrically connected to each other. The ground of the low voltage region 201 and the ground of the high voltage region 202 may be electrically separated.

According to an embodiment, the first processor 210 may be disposed on a first substrate, and the second processor 230 may be disposed on a second substrate. Modules operating in the low voltage region 201 may be disposed on the first substrate, and modules operating in the high voltage region 202 may be disposed on the second substrate. In addition, the isolator 220 may be disposed on the first substrate and/or the second substrate, and may electrically connect the first substrate and the second substrate and simultaneously cutoff the electrical connection. The isolator 220 may transmit information between the first substrate and the second substrate, but may block electrical connections other than a predetermined route. For example, the isolator 220 may block a leakage current between the first substrate and the second substrate.

The isolator 220 disposed between the first processor 210 and the second processor 230 may mutually transmit information between the first processor 210 and the second processor 230. In addition, the isolator 220 may block electrical connections other than information transmitted between the first processor 210 and the second processor 230. For example, the isolator 220 may block a leakage current between the low voltage region 201 and the high voltage region 202.

The first processor 210 according to an embodiment may transmit a monitoring request signal for a plurality of nodes to the second processor 230 through the isolator 220. In addition, the second processor 230 according to an embodiment controls the switch unit 240 according to a monitoring request signal to obtain voltage values for a plurality of nodes, and the obtained voltage value may be transmitted to the first processor 210 through the isolator 220.

The sensor unit 250 according to an embodiment may sense voltages for a plurality of nodes. In addition, a switch unit 240 may be disposed between the sensor unit 250 and the second processor 230. The switch unit 240 may include a plurality of switches, and the sensor unit 250 may include a plurality of sensors corresponding to the plurality of switches.

The switch unit 240 according to an embodiment may be controlled by the second processor 230. In addition, the switch unit 240 may control a current applied to the sensor unit 250. For example, when the switch unit 240 is turned on, a current is connected to the sensor unit 250, and when the switch unit 240 is turned off, the current connected to the sensor unit 250 may be cutoff. Specifically, when a plurality of switches connected to the switch unit 240 is turned on, current may be applied to each of the plurality of sensors included in the sensor unit 250. In addition, when a plurality of switches connected to the switch unit 240 is turned off, current may be blocked in each of the plurality of sensors included in the sensor unit 250.

The plurality of nodes according to an embodiment may include at least one of nodes at both ends of a relay and both ends of a fuse. The relay according to an embodiment may include a module that transfers high voltage power applied from a battery to at least one among a motor, an output terminal, and a display. In addition, the fuse may include a module or device that blocks current when a current or voltage higher than a preset value is applied. More specific embodiments of a plurality of nodes will be described later in FIG. 6.

The first processor 210 according to an embodiment may provide information on charging and discharging states of a battery. For example, when the battery is fully charged or discharged, the first processor 210 may output a message indicating each situation.

Referring to FIG. 2, as one isolator 220 is disposed between the first processor 210 and the second processor 230, although the number of sensors included in the sensor unit 250 is plural and the number of switches included in the switch unit 240 is plural, the battery management system 100 may implement battery management with one isolator 220.

Figure 3:
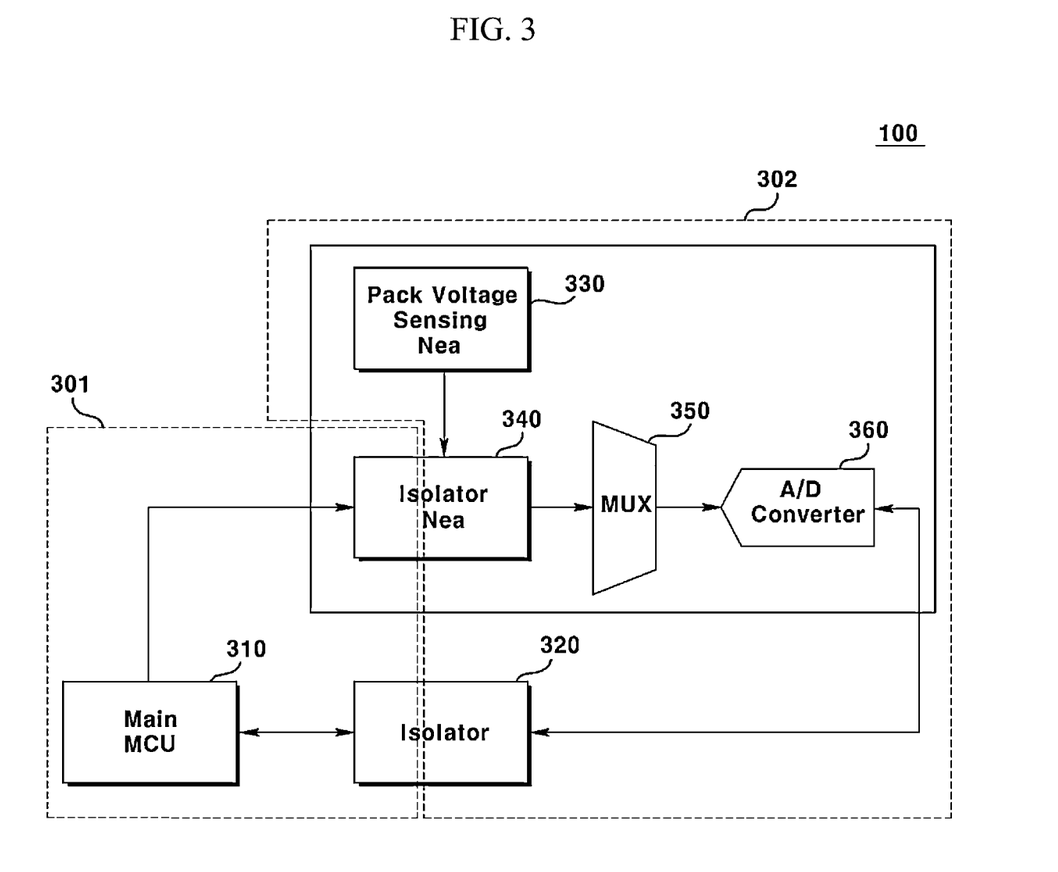
FIG. 3 is a block diagram illustrating an example in which a battery management system according to an embodiment operates using a plurality of isolators.

FIG. 3 is a block diagram illustrating an example in which a battery management system 100 according to an embodiment operates using a plurality of isolators 320 and 340.

As illustrated in FIG. 3, the battery management system 100 may include a main MCU 310, a first isolator 320, a second isolator 340, a sensor unit 330, a MUX 350, and a converter 360. The battery management system 100 according to an embodiment may include a low voltage region 301 and a high voltage region 302, and may operate in the low voltage region 301 and the high voltage region 302. The first isolator 320 and the second isolator 340 may connect the low voltage region 301 and the high voltage region 302.

The second isolator 340 may include a plurality of isolators. In addition, a plurality of isolators may be connected to a plurality of sensors included in the sensor unit 330. Also, the MUX 350 may electrically connect one of a plurality of sensors included in the sensor unit 330 to the converter 360 through a plurality of isolators.

The converter 360 may perform analog-to-digital conversion. For example, the converter 360 may convert a value (e.g., a voltage value) received through the MUX 350 into a digital value. Also, the converter 360 may transmit the value received through the MUX 350 to the main MCU 310 through the first isolator 320.

The sensor unit 330 may include a plurality of sensors, and the plurality of sensors may sense voltage values for a plurality of nodes. In addition, the voltage value sensed by the sensor on the line selected by the MUX 350 is applied to the converter 360 through the second isolator 340 and the MUX 350, and the converter 360 may convert the received voltage value into a digital signal and transmit it to the main MCU 310 through the first isolator 320.

The low voltage region 301 and the high voltage region 302 may be implemented on different substrates. For example, the low voltage region 301 may be implemented in the first substrate, and the high voltage region 302 may be implemented in the second substrate. In this case, the main MCU 310 may be disposed on the first substrate, and the sensor unit 330, the MUX 350, and the converter 360 may be disposed on the second substrate. Further, the first isolator 320 and the second isolator 340 may connect the first substrate and the second substrate. According to the embodiment illustrated in FIG. 3, the battery management system 100 may include a first isolator 320 and a second isolator 340, that is, a plurality of isolators 320 and 340. In particular, the second isolator 340 may include a number of isolators corresponding to the number of a plurality of sensors included in the sensor unit 330.

Figure 4:
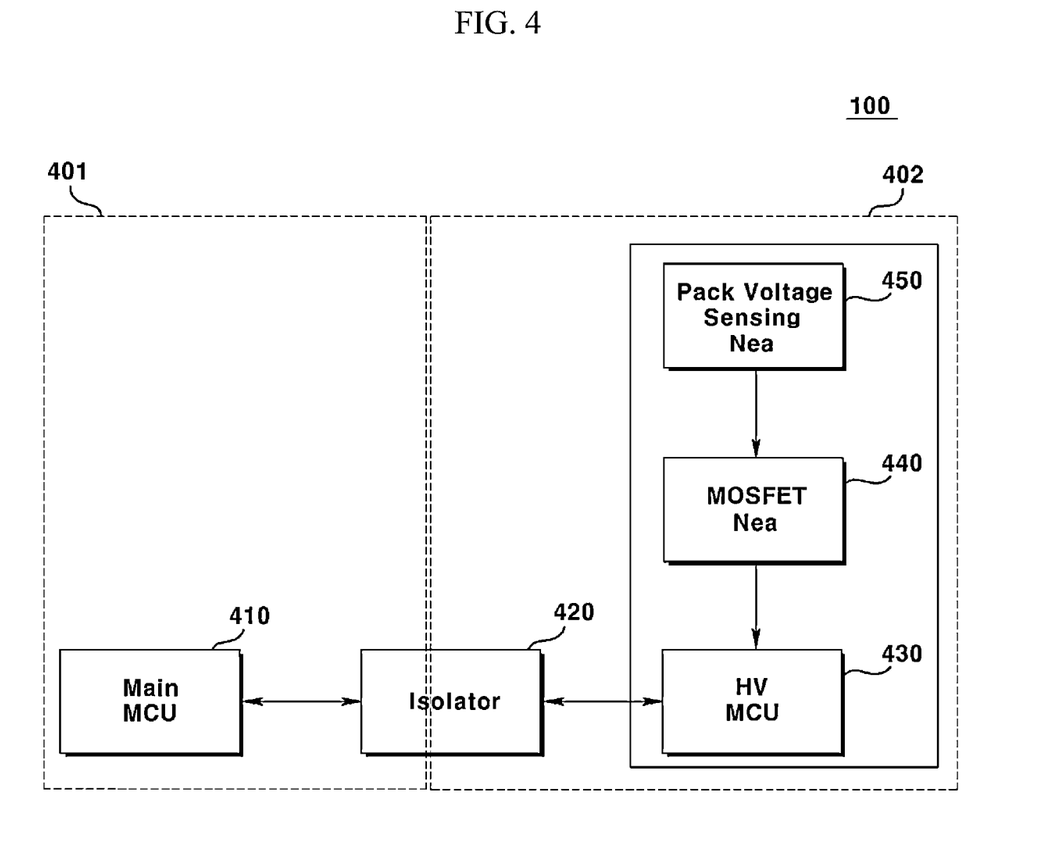
FIG. 4 is a block diagram illustrating an example in which the battery management system according to an embodiment operates in a low voltage region and a high voltage region.

FIG. 4 is a block diagram illustrating an example in which the battery management system 100 according to an embodiment operates in a low voltage region 401 and a high voltage region 402.

As illustrated in FIG. 4, the battery management system 100 may include a main MCU 410, an HV MCU 430, an isolator 420, a sensor unit 450, and a switch unit 440. The battery management system 100 according to an embodiment may include a low voltage region 401 and a high voltage region 402, and may operate in the low voltage region 401 and the high voltage region 402. The isolator 420 may connect the low voltage region 401 and the high voltage region 402.

Since each of the main MCU 410, the isolator 420, the HV MCU 430, the switch unit 440, and the sensor unit 450 illustrated in FIG. 4 may correspond to the first processor 210, the isolator 220, the second processor 230, the switch unit 240, and the sensor unit 250, respectively, disclosed in FIG. 2, the contents of FIG. 2 may be referred to.

The switch unit 440 may include a plurality (e.g., 13) of MOSFETs. The plurality of MOSFETs may operate as switches and may be controlled by the HV MCU 430.

Referring to FIG. 4, the battery management system 100 may operate using only one isolator 420. In addition, the HV MCU 430 may perform an analog digital conversion function. Accordingly, the HV MCU 430 may convert a signal (e.g., voltage values for a plurality of nodes) received through the switch unit 440 into a digital signal and transmit it to the main MCU 410 through the isolator 420.

The low voltage region 401 and the high voltage region 402 may be implemented on different substrates. For example, the low voltage region 401 may be implemented in the first substrate, and the high voltage region 402 may be implemented in the second substrate. In this case, the main MCU 410 may be disposed on the first substrate, and the sensor unit 450, the switch unit 440, and the HV MCU 430 may be disposed on the second substrate. Also, the isolator 420 may connect the first substrate and the second substrate.

Referring to FIG. 4, since the number of isolators to be used is reduced compared to FIG. 3, the cost of isolators may be reduced.

Figure 5:
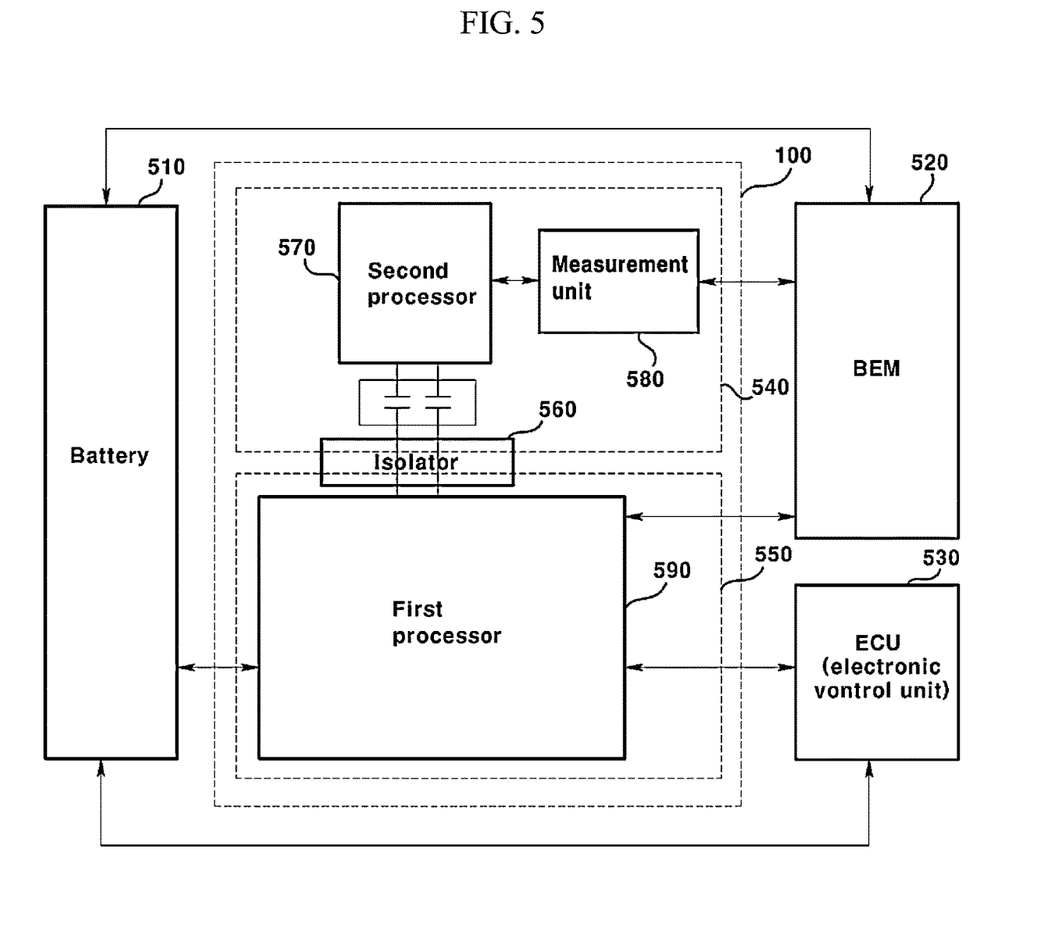

FIG. 5 is a diagram illustrating an example in which a battery management system 100 according to an embodiment operates with a battery 510, a BEM 520, an ECU 530, and the like.

As illustrated in FIG. 5, the battery management system 100 may include a first processor 590, an isolator 560, a second processor 570, and a measurement unit 580. The battery management system 100 according to an embodiment may include a low voltage region 550 and a high voltage region 540, and may operate in the low voltage region 550 and the high voltage region 540. The isolator 560 may connect the low voltage region 550 and the high voltage region 540.

Since each of the first processor 590, the isolator 560 and the second processor 570, and the low voltage region 550 and the high voltage region 540 illustrated in FIG. 5 may correspond to the first processor 210, the isolator 220, the second processor 230, the low voltage region 210, and the high voltage region 202, respectively, disclosed in FIG. 2, the contents of FIG. 2 may be referred to.

In addition, the measurement unit 580 illustrated in FIG. 5 may include one or more sensors and switches. For example, since the measurement unit 580 may include the sensor unit 250 and the switch unit 240 illustrated in FIG. 2, the contents of FIG. 2 may be referred to.

The battery management system 100 may operate by being connected with a battery 510, a battery energy management (BEM) 520, and an ECU 530.

Specifically, power of the battery 510 is applied to the BEM 520, and voltage values for a plurality of nodes included in the BEM 520 are sensed by the measurement unit 580 and may be transmitted to the second processor 570. The second processor 570 may transmit the voltage value sensed by the measurement unit 580 to the first processor 590 through the isolator 560. For example, when the voltage value received from the measurement unit 580 is an analog value, the second processor 570 may convert the analog voltage value into a digital voltage value and transmit it to the first processor 590.

The first processor 590 may control the ECU 530. For example, the first processor 590 may control the ECU 530 using information received from the second processor 570.

The ECU 530 may control an electronic module such as a vehicle and the like. For example, it can control heaters, power supplies, real-time clocks, crash ENS control, and CAN communication. In addition, the ECU 530 may be controlled through a control signal received from the first processor 590. For example, the first processor 590 may request the ECU 530 to output an alarm indicating the state of the battery (e.g., charging, discharging, and abnormal occurrence) through a signal received from the second processor 570.

Figure 6:
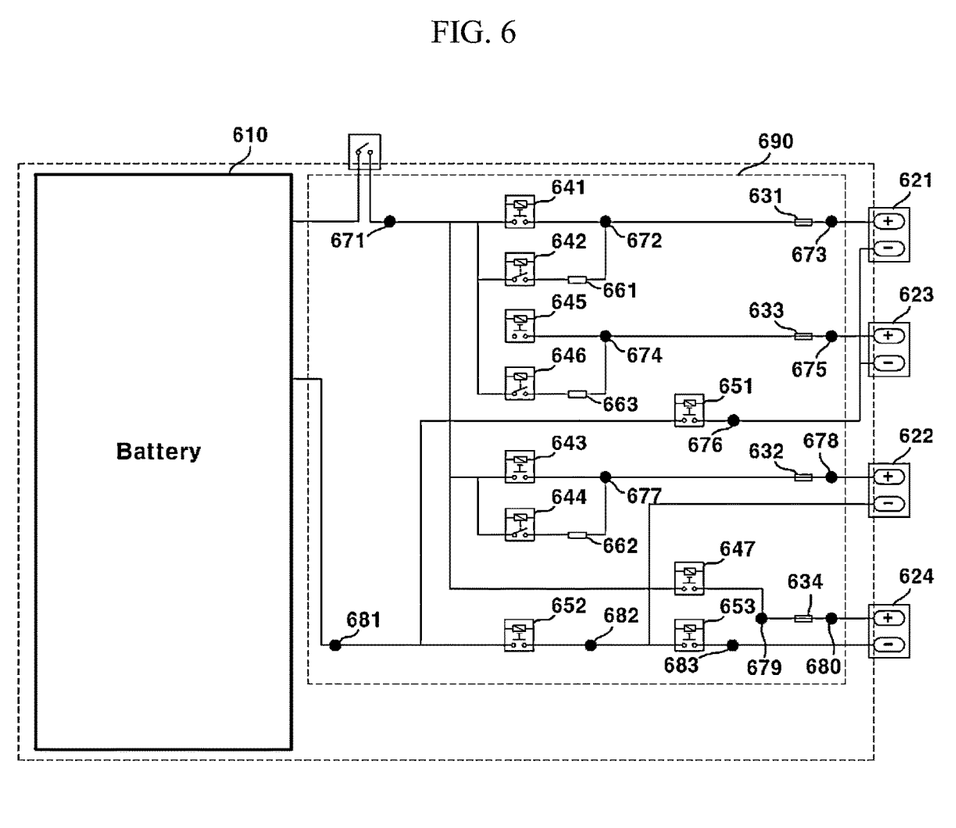
FIG. 6 is a diagram illustrating an example of a plurality of nodes according to an embodiment.

FIG. 6 is a diagram illustrating an example of a plurality of nodes 671 to 683 according to an embodiment.

A plurality of nodes 671 to 683 may be included in some section 690 of the BEM. Some sections 690 of the BEM include a plurality of relays 641, 642, 643, 644, 645, 646, 647, 651, 652, and 653, a plurality of fuses 631, 632, and 633, a plurality of resistors 661, 662, and 663, and a plurality of nodes 671, 672, 673, 674, 675, 676, 677, 678, 679, 680, 681, 682, and 683. In addition, some sections 690 of the BEM may be connected to a plurality of output terminals 621, 622, 623, and 624. The first output terminal 621, the second output terminal 622, the third output terminal 623, and the fourth output terminal 624 may each perform different operations. For example, the first output terminal 621 applies power to the Aux, the second output terminal 622 applies power to the front traction motor, the third output terminal 623 applies power to the rear traction motor, and the fourth output terminal 624 may apply power through a DC charging port.

A voltage may be applied to the plurality of nodes 671 to 683 through power applied from the battery 610. A plurality of nodes 671 to 683 according to an embodiment may include at least one of the nodes among the both ends of the relays 641, 642, 643, 644, 645, 646, 647, 651, 652, and 653, and both ends of the fuses 631, 632, and 633. The relays 641, 642, 643, 644, 645, 646, 647, 651, 652, and 653 according to an embodiment may include a module that transfers the high voltage power applied from the battery 610 to at least one among the motor, the output terminals 621, 622, 623, and 624, and a display. In addition, the fuses 631, 632, and 633 may include a module or device that blocks current when a current or voltage higher than a preset value is applied.

Figure 7:
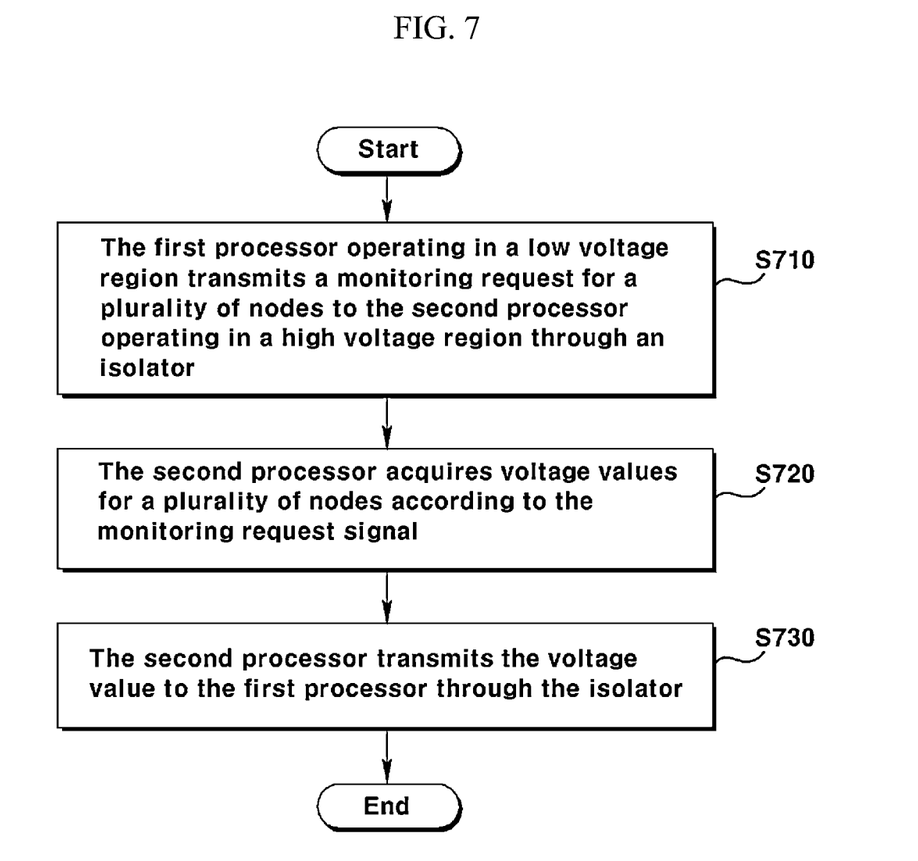
FIG. 7 is a flowchart illustrating an example in which battery management system according to an embodiment operates using a first processor and a second processor.

FIG. 7 is a flowchart illustrating an example in which a battery management system 100 according to an embodiment operates using a first processor and a second processor.

In step S710, the first processor 210 operating in the low voltage region 201 transmits a monitoring request signal for a plurality of nodes to the second processor 230 operating in the high voltage region 202 through the isolator 220.

The first processor 210 according to an embodiment may operate in the low voltage region 201, and the second processor 230 may operate in the high voltage region 202. In addition, an isolator 220 may be disposed between the first processor 210 and the second processor 230. The isolator 220 may mutually transmit information between the first processor 210 and the second processor 230.

The low voltage region 201 and the high voltage region 202 may operate in different voltage ranges. For example, the voltage used in the low voltage region 201 may be 0V to 12V, and the voltage used in the high voltage region 202 may be 0V to 500V. Specifically, the voltage range in which the module included in the high voltage region 202 operates may be 300V to 500V.

The isolator 220 disposed between the first processor 210 and the second processor 230 may mutually transmit information between the first processor 210 and the second processor 230. In addition, the isolator 220 may block electrical connections other than information transmitted between the first processor 210 and the second processor 230. For example, the isolator 220 may block a leakage current between the low voltage region 201 and the high voltage region 202.

The first processor 210 according to an embodiment may transmit a monitoring request signal for a plurality of nodes to the second processor 230 through the isolator 220.

In addition, in step S720 according to the monitoring request signal transmitted in step S710, the second processor 230 acquires voltage values for a plurality of nodes.

The second processor 230 may acquire voltage values for a plurality of nodes through one or more switches and one or more sensors operating in the high voltage region 202, and the second processor 230 may convert the obtained voltage value into a digital signal.

In step S730, the second processor 230 transmits the voltage value to the first processor 210 through the isolator 220. At this time, the voltage value transmitted through the isolator 220 may be converted into a digital signal and transmitted.

In step S710, a monitoring request signal for a plurality of nodes is transmitted to the second processor 230 through the isolator 220, and since the voltage value converted to the digital signal in step S730 is transmitted to the first processor 210 through the isolator 220 the battery management may be performed through one isolator 220.

In addition, the method of FIG. 7 can be understood with reference to the contents described above in FIGS. 1 to 6.

Meanwhile, the above-described method can be written as a program that can be executed on a computer, and can be implemented in a general-purpose digital computer that operates the program using a computer-readable recording medium. In addition, the structure of the data used in the above-described method can be recorded on a computer-readable recording medium through various means. The computer-readable recording medium includes storage media such as magnetic storage media (for example, ROM, RAM, USB, floppy disk, hard disk, and the like), optical reading media (for example, CD-ROM, DVD, and the like). The embodiments of the present invention have been described above with reference to the accompanying drawings, but a person skilled in the art to which the present invention belongs may understand that the present invention can be implemented in other specific forms without changing the technical idea or essential features. Therefore, it should be understood that the embodiments described above are illustrative and non-limiting in all respects.

The invention claimed is:

1. A battery management system comprising:
a first processor disposed on a first substrate;
a second processor disposed on a second substrate;
a first isolator disposed between the first substrate and the second substrate;
a sensor unit configured to sense voltages for a plurality of nodes; and
a switch unit disposed between the sensor unit and the second processor and configured to control a current applied to the sensor unit,
wherein the first isolator is configured to transmit information between the first substrate and the second substrate,
wherein the switch unit comprises a plurality of switches connected to the sensor unit and the second processor, and
wherein the sensor unit comprises a plurality of sensors corresponding to the plurality of switches, the plurality of switches configured to control a current applied to each of the plurality of sensors.

2. The battery management system according to claim 1, wherein the first processor transmits a monitoring request signal for the plurality of nodes to the second processor through the first isolator,
wherein the second processor controls the switch unit according to the monitoring request signal to obtain voltage values for the plurality of nodes, and
wherein the second processor transmits the voltage values to the first processor through the first isolator.

3. The battery management system according to claim 1, wherein the plurality of switches are configured to control the current applied to each of the plurality of sensors simultaneously.

4. The battery management system according to claim 1, wherein the switch unit is controlled by the second processor,
wherein when the switch unit is turned on, current is connected to the sensor unit, and
wherein when the switch unit is turned off, current connected to the sensor unit is cutoff.

5. The battery management system according to claim 1, wherein the plurality of nodes includes at least one of nodes among both ends of a relay and both ends of a fuse.

6. The battery management system according to claim 5, wherein the relay transfers high voltage power applied from the battery to at least one of a motor, an output terminal, and a display.

7. The battery management system according to claim 1, wherein the first processor operates in a low voltage region and the second processor operates in a high voltage region.

8. The battery management system according to claim 7, wherein a ground level of the low voltage region and a ground level of the high voltage region are different from each other, and
   wherein voltage used in the low voltage region is 12V or less, and voltage used in the high voltage region is 500V or less.

9. The battery management system according to claim 1, wherein the first processor provides information on charging and discharging states of the battery.

10. A method for managing a battery using the battery management system according to claim 1, the method comprising:
   transmitting a monitoring request signal for the plurality of nodes to the second processor operating in the high voltage region through the first isolator, by the first processor operating in the low voltage region;
   obtaining voltage values for the plurality of nodes according to the monitoring request signal by the second processor; and
   transmitting the voltage values to the first processor through the first isolator by the second processor.

11. The battery management system according to claim 1, wherein the switches of the plurality of switches are metal-oxide-semiconductor field effect transistors (MOSFETs).

12. The battery management system according to claim 11, wherein the plurality of switches comprise 13 MOSFETs.

13. The battery management system according to claim 11, wherein the battery management system is free from any additional isolators between the first substrate and the second substrate, other than the first isolator.

14. The battery management system according to claim 1, wherein the battery management system is free from any additional isolators between the first substrate and the second substrate, other than the first isolator.

* * * * *